Aug. 9, 1955
W. H. BINYON
2,714,863
PLANTING DEVICE
Filed March 16, 1950
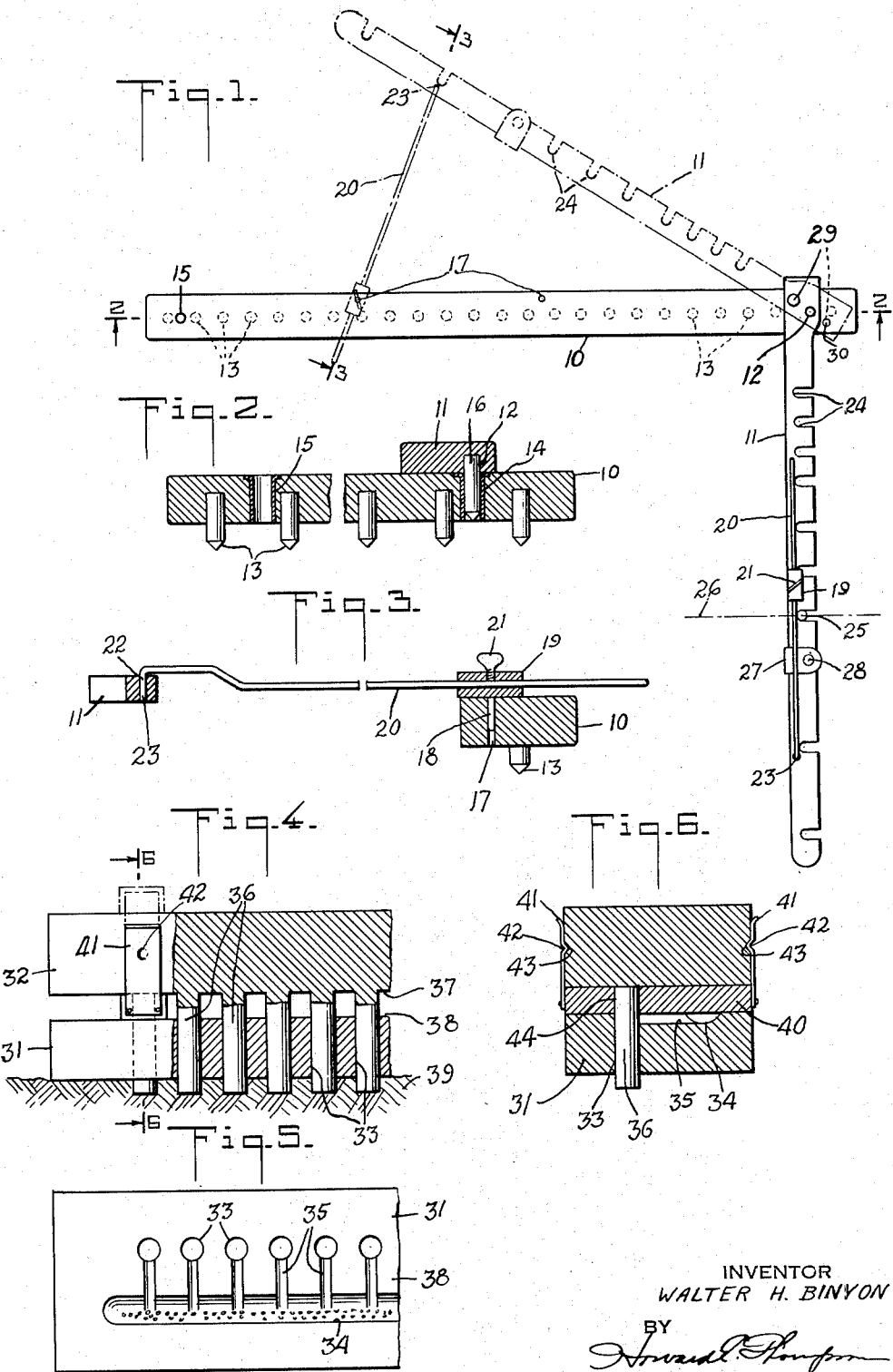
INVENTOR
WALTER H. BINYON
BY
ATTORNEY

United States Patent Office 2,714,863
Patented Aug. 9, 1955

2,714,863

PLANTING DEVICE

Walter H. Binyon, Cedar Grove, N. J.

Application March 16, 1950, Serial No. 150,042

1 Claim. (Cl. 111—99)

This invention relates to devices for use in simplifying the layout of gardens or a planting board of any kind and to facilitate the planting of seeds in definitely spaced relationship to each other and in alined rows. More particularly, the invention deals with a device of this kind, including means for measuring the spacing of rows one from another and to control and regulate circular planting in circular beds. Still more particularly, the invention relates to a tool having means for varying the depth of planting and for definitely delivering seeds to a predetermined depth in the ground in a planting operation.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a plan view of one form of device or tool which I employ, indicating a modified use of the tool in broken dot and dash lines.

Fig. 2 is a partial section on the line 2—2 of Fig. 1 on an enlarged scale.

Fig. 3 is a section on the line 3—3 of Fig. 1 indicating the modified use of the tool, as represented in dot and dash lines in Fig. 1, with parts of the construction broken away.

Fig. 4 is a view similar to Fig. 1 showing a modified form of tool showing one end portion thereof.

Fig. 5 is a plan view of one part of the tool seen in Fig. 4; and

Fig. 6 is a section on the line 6—6 of Fig. 4.

In Figs. 1 to 3, inclusive, I have shown one form of tool which comprises a main mould bar 10 and a supplemental measuring bar 11, arranged upon the upper surface of and pivoted to one end portion of the bar 10, as seen at 12. The bar 10 may be of any desired length and, when employed in planting large gardens, rather than beds or cold-frames, the bar 10 may be, for example, 4' long and have spaced longitudinally of the lower surface thereof mould pins 13 at preferably 2" center spacings. The bar 10 has, at its end portions, sleeves 14 and 15 forming pivot bearings, one of which, the sleeve 14, forms a pivot bearing for a pivot pin 16 at one end of the bar 11 and forming the pivot above described, as at 12.

The pin 16 may also be inserted into the sleeve 15 in the use of the bar 11 to space one row of planting from an adjacent row. The bar 10 also has two or more apertures 17 spaced longitudinally thereof for reception of a pivot pin 18 on the clamp block 19 of a spacer rod 20. The rod 20 is adjustably clamped in the block 19 by a set screw 21. One end of the rod has an offset pin portion 22 which is adapted to be coupled with an aperture 23 in the bar 11 in the use of the device, as seen in dot-dash lines in Fig. 1 and also in the normal non-use mounting of the rod 20, as seen in full lines in Fig. 1.

The bar 11 has a series of notches 24 opening through one side edge portion thereof and these notches are spaced at predetermined measured distances from the pin 16 to control spacing between rows of planting and also to control positioning of planting in circular beds, as later described.

In Fig. 1 of the drawing, I have indicated at 25 one dowel pin arranged in one of the notches 24 and let us say that this pin is located 20" from the pivot 12. Then a secondary row, represented by the dot and dash line 26, would be substantially 20" spacing from the row defined by the line of pins 13. Slidably mounted on the bar 11 is a yoke member 27 having apertures 28 adapted to register with the notches 24 and to receive dowel pins in utilizing the bar 11 as a spacing tool in spacing plants one with respect to another irregularly in a bed. For this purpose, the bar 11 has another aperture 29, adjacent the pin 16, for receiving another dowel pin.

In the use of the device, as shown in full lines in Fig. 1, after a garden has been prepared for planting and one line of planting has been determined by a marking string, chalk mark or otherwise, the bar 10 is moved longitudinally of the string or the chalk mark, pressed into the ground to form a series of seed-receiving openings by the mould pins 13 and, as the tool or device is moved longitudinally of the first row, dowel pins are set into the ground at spaced intervals, as at 25, to line-up the next successive row of planting, after which the bar 10 is moved along this row to form the moulded seed-receiving holes and, as each row of holes is formed, the seeds are dropped into the holes and the ground tamped to cover the seeds. Using the tool as a circular bed planter, the bar 11 is first inverted on the bar 10, into the position indicated in dotted lines in Fig. 1 with the aperture 29 arranged over an aperture 30 in the bar 10. A long pivot dowel pin is passed through the apertures 29 and 30. The rod 20 and its associated parts are used in adjustably coupling the bars 10 and 11 in different angular positions, as noted in dotted lines in Fig. 1, and here any one or more of the notches 24 can be utilized to form, by the use of dowel pins, markings in a circular bed to locate positions of plants. The complete assemblage is swung on the axis defined by the aperture 30 in an anti-clockwise direction in bringing the bar 11 into the different radial positions which would be governed by the angular spacing of the bars 10 and 11, one with respect to the other.

In Figs. 4 to 6, inclusive, I have shown a modified form of device, wherein the same is preferably made in a relatively short length and wherein the members of the device, for the most part, can be composed of moulded plastic material, it being understood, however, that any method of construction can be employed. However, in the accompanying drawing, the parts are illustrated as being moulded plastic members.

The members comprise two bars 31 and 32. The bar 31 forms a seed positioning bar, whereas the bar 32 forms a seed planting bar. A plan view of the bar 31 is shown in Fig. 5 of the drawing. This bar has a series of seed-receiving apertures 33 disposed longitudinally thereof and preferably offset with respect to the center of the bar, the other side of the bar having a longitudinal seed trough or channel 34 with branch grooves 35 placing the channel 34 in communication with the apertures 33, as clearly noted in Fig. 6.

The bar 32 has a series of pins 36 arranged on one surface thereof and at a spacing common to the spacing of the apertures 33 and freely fitting in said apertures. The pins 36 are of sufficient length so that, when the lower surface 37 of the bar 32 fits on the upper surface 38 of the bar 31, the pins 36 will plant the average seed at the required depth in the soil which is indicated in section at 39 in Fig. 4 of the drawings. However, when it is desirable to arrange for shallow plantings, shim members or blocks 40 are spaced along the members 31 and 32 at suitable intervals, the same being held in position by spring clips 41 at the sides of the block and having indentures 42 engaging appropriate recesses 43 in the member 32. The blocks 40 are also preferably apertured, as seen at 44, to receive one or more of the pins 36.

It will be understood that the bar 32, in an inverted position, may be utilized as a tamping bar for tamping the ground in order to set the seeds after being moved to the required depth in the soil by the pins 36.

As previously pointed out, the measuring bar 11 may be utilized for spacing plants at equal distances apart in what I term "toggling." In this operation, a long dowel pin is placed in the aperture 29 and, in one of the recesses 24, where the yoke or cleat member 27 which can be termed a toggle cleat, has been positioned. For example, considering Fig. 1, if a long dowel pin were arranged in the aperture 28 and another in the aperture 29, this could comprise a measuring toggle distance for spacing of plants and the bar 11 is simply shifted by using one of the large dowels as a pivot to equally space plantings one from another in rows or otherwise. By utilizing the long dowels, this operation can be accomplished without the need of body bending.

For purposes of description, the side edge portion of the bar 10 having pivot 12 and apertures 17 will be regarded as the left side of the bar and the other side edge portion the right side. Correspondingly, the notches 24 are on the right side edge of the bar 11. Thus, considering the full line showing in Fig. 1 the bar 11 has moved outwardly with respect to the right side edge of bar 10 with the notches 24 at the right side edge of bar 11 directed away from bar 10.

Having fully described my invention, what I claim as new and desire to secure by Letters Patent is:

A tool for use in planting, said tool comprising an elongated bar having spaced mould pins projecting from the lower surface thereof and spaced longitudinally of the bar for forming openings defining positions and spacing of seeds in the operation of planting the same, an associated bar arranged upon the upper surface of and having a pivot pin, adjacent one side edge at one end thereof, engaging a pivot aperture at one end portion of the first named bar, said associated bar having, at said side edge portion, a plurality of notches spaced longitudinally of and opening outwardly through the said side edge thereof, said notches forming means to gauge spacing of rows of marking pins adapted to be positioned in said notches in the operation of planting, said associate bar being swingable relatively to the first named bar on its pivot, a spacer rod adjustably and pivotally coupled with the associated bar, and means adjustable longitudinally on the rod and adjustably connectable with the first named bar to couple said bars in predetermined angular relationship one with respect to the other.

References Cited in the file of this patent

UNITED STATES PATENTS

| | | |
|---|---|---|
| 477,776 | Nichols | June 28, 1892 |
| 491,036 | Buckingham | Jan. 31, 1893 |
| 768,740 | Fletcher | Aug. 30, 1904 |
| 1,183,653 | Kring | May 16, 1916 |
| 1,191,906 | Miller | July 18, 1916 |
| 1,238,832 | Shelby et al. | Sept. 4, 1917 |
| 1,564,721 | Tallon | Dec. 8, 1925 |
| 1,916,638 | Rizianu | July 4, 1933 |

FOREIGN PATENTS

| | | |
|---|---|---|
| 11,569 | Great Britain | 1909 |
| 16,385 | Germany | Jan. 24, 1882 |
| 64,885 | Denmark | Oct. 14, 1946 |
| 649,655 | France | Sept. 4, 1928 |